US008343316B2

(12) United States Patent
Williams et al.

(10) Patent No.: US 8,343,316 B2
(45) Date of Patent: Jan. 1, 2013

(54) VACUUM DEHYDRATOR

(75) Inventors: Mortimer Daniel Williams, Sturbridge, MA (US); John G. Donnelly, Webster, MA (US); Eric M. Laliberte, Spencer, MA (US); J. Rafael Lazo, Worcester, MA (US); Juan Alejandro Segrelles Sacristan, Saragossa (ES); Anselmo Garcia Gracia, Saragossa (ES)

(73) Assignee: Siemens Industry, Inc., Alpharetta, GA (US)

( * ) Notice: Subject to any disclaimer, the term of this patent is extended or adjusted under 35 U.S.C. 154(b) by 447 days.

(21) Appl. No.: 12/615,889

(22) Filed: Nov. 10, 2009

(65) Prior Publication Data

US 2011/0108408 A1  May 12, 2011

(51) Int. Cl.
*B01D 1/14* (2006.01)
*B01D 3/10* (2006.01)
*B01D 17/035* (2006.01)

(52) U.S. Cl. .......... 203/12; 159/16.1; 159/29; 159/47.1; 159/901; 159/DIG. 16; 202/158; 202/176; 202/185.4; 202/197; 202/205; 203/40; 203/49; 203/91; 196/98; 196/110; 196/114; 196/140; 208/184; 208/366; 261/148; 261/151; 261/DIG. 72

(58) Field of Classification Search .................. 202/158, 202/176, 185.4, 197, 205, 234, 237; 203/12, 203/40, 49, 91; 196/98, 110, 114, 140; 208/184, 208/353, 355–358, 366; 261/126, 148, 151, 261/DIG. 72; 159/16.1, 29, 47.1, 901, DIG. 16, 159/DIG. 40
See application file for complete search history.

(56) References Cited

U.S. PATENT DOCUMENTS

| | | | | |
|---|---|---|---|---|
| 3,506,696 A | * | 4/1970 | Baker et al. ................ | 554/205 |
| 3,898,058 A | * | 8/1975 | McGill ...................... | 95/246 |
| 4,781,797 A | * | 11/1988 | Johnson .................... | 96/194 |
| 5,034,103 A | * | 7/1991 | Hamer et al. .............. | 202/158 |
| 5,352,335 A | * | 10/1994 | Beaver ...................... | 203/11 |
| 6,001,220 A | | 12/1999 | Hillstrom | |
| 6,517,725 B2 | | 2/2003 | Spearman et al. | |
| 7,087,157 B2 | * | 8/2006 | Spani ........................ | 210/96.1 |
| 7,892,335 B2 | * | 2/2011 | Kellens et al. ............ | 96/234 |
| 2005/0066823 A1 | | 3/2005 | De Suray et al. | |

FOREIGN PATENT DOCUMENTS

EP    1905816 A1    4/2008
GB    2323048 A     9/1998

OTHER PUBLICATIONS

PCT International Search Report dated Apr. 1, 2011 corresponding to PCT International Application No. PCT/US2010/054913 filed Nov. 1, 2010 (9 Pages).
AMISTCO Product Bulletin, "AMISTCO Pall Ring Packing". AMISTCO Separation Products, Inc. Worldwide. Alvin, TX. Nov. 2003. <www.amistco.com>.

* cited by examiner

*Primary Examiner* — Virginia Manoharan

(57) ABSTRACT

A vacuum dehydrator for processing an oil containing entrained contaminants such as water, air, and particulates comprises a tower enclosing upper and lower chambers. A random packing is contained in the upper chamber. The oil is preheated to a temperature above the boiling point of water and is introduced into the upper chamber for downward flow through the random packing into the lower chamber. Entrained air and water is retained as water vapor in the upper chamber, and particulates are retained in the random packing. Heated ambient air is introduced into the lower chamber for upward flow through the random packing into the upper chamber, and the upper chamber is cooled to condense the water vapor. Oil and condensed water are pumped respectively from the lower and upper chambers.

12 Claims, 2 Drawing Sheets

VACUUM DEHYDRATOR

BACKGROUND

1. Field of the Invention

This invention relates to vacuum dehydrators used to remove entrained contaminants such as air, water, and particulates from mineral and synthetic based oils and mixtures thereof.

2. Description of the Prior Art

Conventional vacuum dehydrators typically employ mesh type screens having 140-400 wires per inch. Such fine screens operate satisfactorily when processing low viscosity highly filtered oils. However, when used in systems with coarse filtration, where the oils have higher viscosities in the ISO 100-680 range, the screens have a tendency to become clogged, thus compromising the operational efficiency of the dehydrators.

There exists a need, therefore, for an improved vacuum dehydrator capable of efficiently processing highly contaminated high viscosity oils.

SUMMARY OF THE INVENTION

In accordance with the present invention, a tower encloses upper and lower chambers. The upper chamber contains a random packing of low density high surface area elements. The contaminated oil is preheated to a temperature above the boiling point of water and is introduced into the upper chamber for downward flow through the random packing and into the lower chamber. The downward oil flow is accompanied by a separation or "boiling off" of entrained air and water in the form of water vapor, and retention of particulates within the random packing. An internal condenser serves to condense water vapor in the upper chamber. Heated ambient air is introduced into the lower chamber for upward flow through the random packing. A first pump creates a vacuum in the upper chamber, in addition to also serving to draw the heated air up through the random packing while removing water and water vapor from the upper chamber to an external condenser. A second pump serves to remove the dried de-aerated and filtered oil from the lower chamber.

These and other features and their attendant advantages will now be described in more detail with reference to the accompanying drawings, wherein:

DETAILED DESCRIPTION

With reference to the drawings, a vacuum dehydrator in accordance with the present invention comprises a tower 10 enclosing upper and lower chambers 12, 14. A random packing 16 is contained in the upper chamber.

Figure 1:
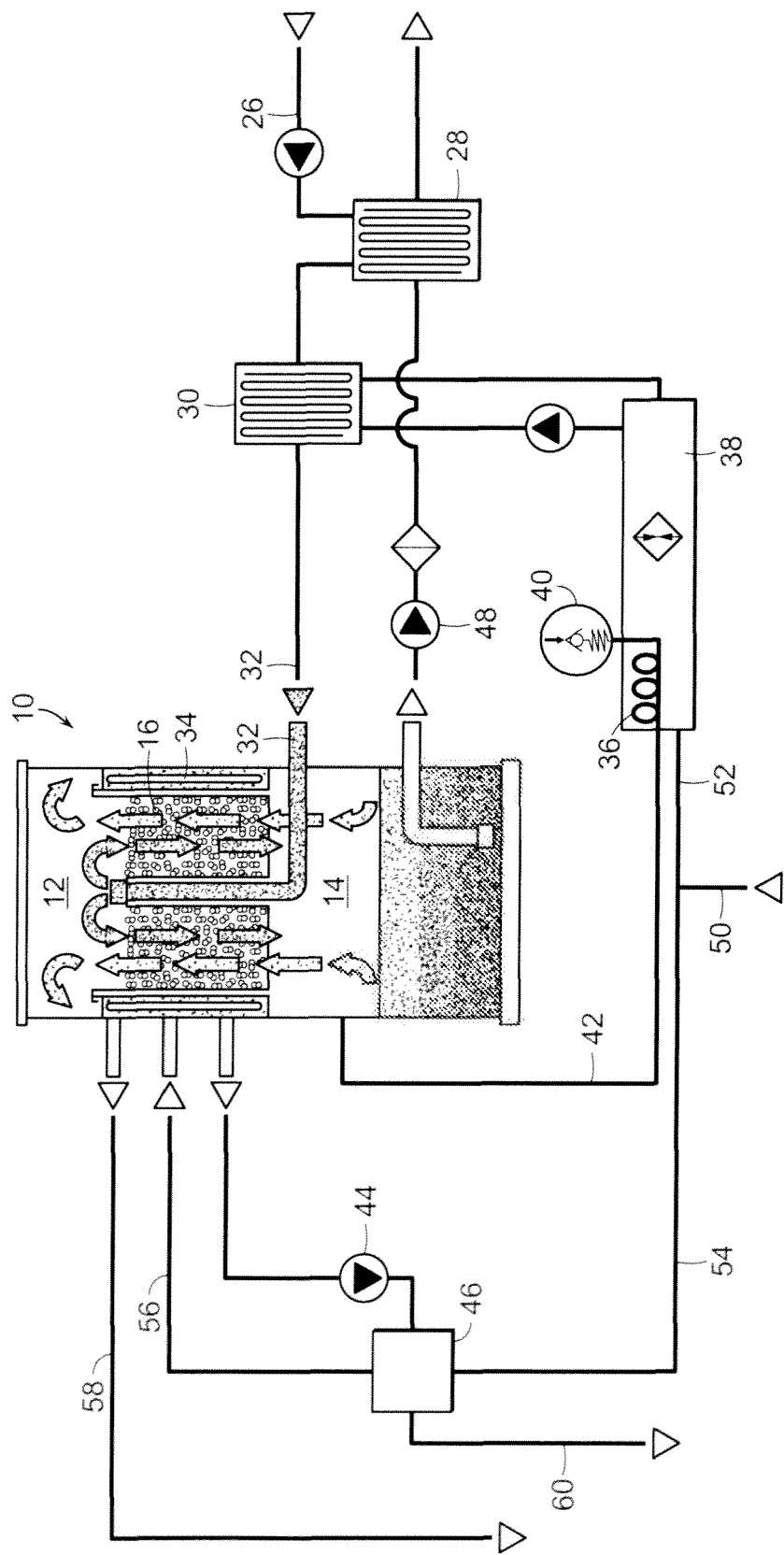
FIG. 1 is a diagrammatic illustration of a vacuum dehydrator and associated system components in accordance with the present invention.
Figure 2:
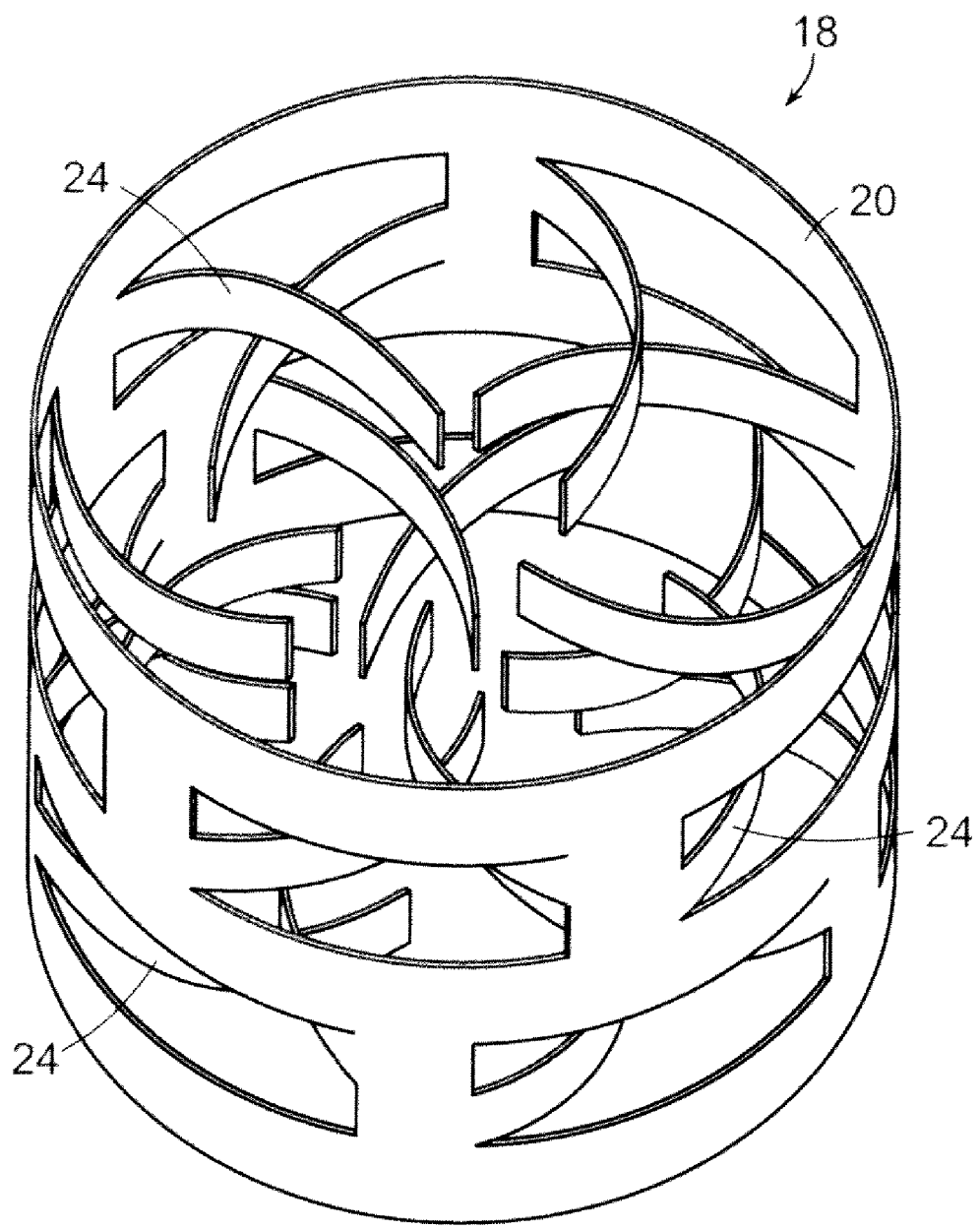
FIG. 2 is a perspective view of a pall ring of the type employed in the random packing of the present invention.

The random packing preferably consists of pall rings, an example of which is depicted at 18 in FIG. 2. The pall ring comprises a cylindrical wall 20 with inwardly bent protrusions 24. Pall rings may be obtained from Amistco Co. of Alvin, Tex., USA.

The system is designed to process oils that have relatively high viscosities in the ISO 32-680 range, that are highly contaminated with entrained air and/or water, and that include particulates exceeding the maximum 23/21/18 range listed in ISO 4406 (1999 rev.). As herein employed, the term "oils" is intended to be construed broadly to include mineral and synthetic based oils, and mixtures thereof.

The contaminated oil is received via conduit 26 and initially preheated to a temperature above the boiling point of water, and preferably between about 60-80° C. by a first heating means comprising primary and secondary heat exchangers 28, 30. A first inlet means comprising conduit 32 enters the tower via lower chamber 14 and passes upwardly through the random packing 16 to discharge the heated oil into the upper chamber 12. From here, the oil flows downwardly back through the random packing into the lower chamber. Downward flow is accompanied by separation of entrained air and water as water vapor boiled off from the oil, and retention of particulates within the random packing.

A cooling means comprising an internal water cooled condenser 34 surrounds the upper chamber 12 and serves to condense the water vapor rising from the random packing.

A second heating means comprising a coil 36 in a hot water tank 38 serves to heat ambient air received via an adjustable vacuum relief valve 40. The air is heated to a temperature approximately the same as that of the contaminated oil. A second inlet means comprising conduit 42 serves to introduce the thus heated air into the lower chamber 14 for upward flow through the random packing 16.

A first pump 44 creates a vacuum in the upper chamber 12 in addition to drawing heated air and water vapor up through the random packing 16, and removing water and water vapor from the upper chamber to a water cooled condensate tank 46.

A second pump 48 serves to remove the dried de-aerated and filtered oil from the lower chamber. The output of pump 48 is directed to and through the primary heat exchanger 28 to serve as its heat source for the incoming contaminated oil. Hot water from tank 38 serves as the heat source for the secondary heat exchanger 30.

By controlling adjustment of the vacuum relief calve 40 and the operation of pump 44, the pressure in upper chamber 12 is maintained at between about 0.0 and −0.85 bar. This low pressure allows water entrained in the oil to boil off at temperatures as low as 65° C. Preheating the incoming ambient air helps keep suspended water vapor from condensing before being exhausted from the upper chamber 12.

Water is admitted to the system via conduit 50, is supplied to the hot water tank 38 and the condensate tank via branch conduits 52, 54, and is supplied from the condensate tank to condenser 34 via conduit 56. Water is removed from the condenser 34 and condensate tank 46 respectively by conduits 58 and 60.

The system is capable of removing up to 100% of free emulsified water and 90% of dissolved water and air from the oils being processed. Moisture levels can be reduced to as low as 20 PPM. Although pall rings are preferred for the random packing, other substantially equivalent candidates may be substituted, potential examples being high performance packings, raschid rings, etc. of the type also available from Amistco Co.

The foregoing description has been set forth to illustrate the invention and is not intended to be limiting. Since further modifications of the described embodiments incorporating the spirit and substance of the invention may occur to persons skilled in the art, the scope of invention should be limited solely with reference to the appended claims and equivalents thereof.

What is claimed is:

1. A vacuum dehydrator for processing an oil containing entrained contaminants including water, air and particulates, said dehydrator comprising:
    a tower enclosing upper and tower chambers;
    a random packing in said upper chamber;
    first heating means for preheating the oil to a temperature above the boiling point of water;
    first inlet means for introducing the preheated oil into said upper chamber for
        downward flow through said random packing into said lower chamber,
        said downward flow being accompanied by separation of entrained air and water from the oil as water vapor accumulating in said upper chamber,
        and retention of particulates within said random packing, said first inlet means comprising a conduit entering said tower in said lower chamber beneath said random packing, and passing upwardly through said random packing to discharge the preheated oil into said upper chamber above said random packing;
    second heating means for heating ambient air;
    second inlet means for introducing the thus heated ambient air into said lower chamber for upward flow through said random packing into said upper chamber;
    cooling means for condensing water vapor accumulating in said upper chamber, said cooling means being configured and arranged to surround said upper chamber;
    first pump means for creating a vacuum in said upper chamber and for removing condensed water vapor from said upper chamber; and
    second pump means for removing oil from said lower chamber.

2. The vacuum dehydrator of claim 1 wherein said random packing is comprised of pall rings.

3. The vacuum dehydrator of claim 1 wherein said first heating means comprises primary and secondary heat exchangers operating in sequence to raise the temperature of the oil.

4. The vacuum dehydrator of claim 3 wherein the oil removed from said lower chamber by said second pump means serves as a heat source for said primary heat exchanger.

5. The vacuum dehydrator of claim 3 wherein heated water additionally serves as a heat source for said secondary heat exchanger.

6. The vacuum dehydrator of claim 1 wherein said cooling means comprises a water cooled condenser.

7. The vacuum dehydrator of claim 1 wherein said second heating means comprises a coil in a tank containing heated water and through which ambient air is drawn into said lower chamber.

8. The vacuum dehydrator of claim 7 wherein the air is heated to approximately the same temperature as that of the preheated oil being introduced into said upper chamber.

9. The vacuum dehydrator of claim 1 wherein the vacuum created in said upper chamber is between 0.0 and −0.85 bar.

10. A method of processing an oil containing entrained contaminants including water, air, and particulates, said method comprising:
    providing a tower enclosing upper and lower chambers, with said upper chamber containing a random packing;
    preheating the oil to a temperature exceeding the boiling point of water;
    admitting the preheated oil into said upper chamber via a conduit entering said tower in said lower chamber and passing upwardly through said random packing to discharge the reheated oil above said random packing, with downward flow of the preheated oil through said random packing being accompanied by separation of entrained air and water from the oil as water vapor, and retention of particulates in said random packing;
    providing an upward flow of heated air through said random packing into said upper chamber;
    creating a vacuum in said upper chamber;
    condensing said water vapor by employing cooling means configured and arranged to surround said upper chamber; and
    exhausting said heated air and condensed water vapor from said upper chamber.

11. The method of claim 10 wherein the vacuum created in said chamber is between 0.0 and −0.85 bar.

12. The method of claim 10 wherein said upward flow of air is heated to approximately the same temperature as that of the preheated oil being admitted into said upper chamber.

* * * * *